US010840726B2

(12) United States Patent
Provencher et al.

(10) Patent No.: US 10,840,726 B2
(45) Date of Patent: Nov. 17, 2020

(54) ELECTRONIC DEVICE WITH WIRELESS CHARGING AND BATTERY HEATING (71) Applicant: Apple Inc., Cupertino, CA (US)

(72) Inventors: Corey S. Provencher, Santa Clara, CA (US); Michael V. Yeh, Cupertino, CA (US); Jason L. Pang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 169 days.

(21) Appl. No.: 15/587,272

(22) Filed: May 4, 2017

(65) Prior Publication Data
US 2018/0013311 A1 Jan. 11, 2018

Related U.S. Application Data
(60) Provisional application No. 62/359,333, filed on Jul. 7, 2016.

(51) Int. Cl.
H02J 7/02 (2016.01)
H02J 50/10 (2016.01)
H01M 10/615 (2014.01)
H01M 10/6571 (2014.01)
H01M 10/48 (2006.01)
H02J 50/90 (2016.01)
H02J 50/20 (2016.01)
(Continued)

(52) U.S. Cl.
CPC ........... *H02J 7/025* (2013.01); *H01M 10/486* (2013.01); *H01M 10/488* (2013.01); *H01M 10/615* (2015.04); *H01M 10/6571* (2015.04); *H02J 50/10* (2016.02); *H01M 2220/30* (2013.01); *H02J 50/15* (2016.02); *H02J 50/20* (2016.02); *H02J 50/30* (2016.02); *H02J 50/40* (2016.02); *H02J 50/90* (2016.02); *H04W 40/08* (2013.01)

(58) Field of Classification Search
CPC .. H02J 7/025; H02J 50/10; H02J 50/90; H02J 50/12; H02J 50/708; H01M 10/488
USPC ................................. 320/108, 137; 307/104
See application file for complete search history.

(56) References Cited

U.S. PATENT DOCUMENTS

5,281,792 A * 1/1994 Lee ........................... H02J 7/00
219/209
5,795,664 A 8/1998 Kelly
(Continued)

Primary Examiner — David V Henze-Gongola
Assistant Examiner — Tarikh Kanem Rankine
(74) Attorney, Agent, or Firm — Treyz Law Group, P.C.; Jason Tsai (57) ABSTRACT A wireless power transmitting device may transmit wireless power signals to a wireless power receiving electronic device. The electronic device may have a coil that receives the transmitted wireless power signals and may have a power receiving circuit that rectifies the received wireless power signals to produce a corresponding direct-current voltage signal. The direct-current signal may be used to power circuitry in the electronic device and may be used to charge a battery in the electronic device. Control circuitry in the electronic device may use a temperature sensor to make temperature measurements. In response to detecting that the device is below a given threshold temperature and based on other information such as information on which applications are running on a controller in device, the device may supply drive current signals to the coil to heat the battery and improve battery performance.

20 Claims, 5 Drawing Sheets (51) Int. Cl.
  *H02J 50/30* (2016.01)
  *H02J 50/40* (2016.01)
  *H04W 40/08* (2009.01)
  *H02J 50/15* (2016.01)

(56) References Cited

U.S. PATENT DOCUMENTS

| | | | |
|---|---|---|---|
| 6,008,622 A * | 12/1999 | Nakawatase | H01F 38/14 |
| | | | 320/108 |
| 6,928,559 B1 | 8/2005 | Beard | |
| 8,448,000 B2 * | 5/2013 | Culbert | G06F 1/20 |
| | | | 713/320 |
| 8,554,389 B2 * | 10/2013 | Cox | G06F 1/203 |
| | | | 700/299 |
| 9,083,198 B2 | 7/2015 | Sutarwala et al. | |
| 9,209,627 B2 | 12/2015 | Baarman et al. | |
| 9,474,027 B2 * | 10/2016 | Prociw | H04W 52/0251 |
| 2011/0052944 A1 * | 3/2011 | Matthias | H01M 10/44 |
| | | | 429/50 |
| 2011/0220639 A1 * | 9/2011 | Gerhardinger | H01F 38/14 |
| | | | 219/660 |
| 2011/0259960 A1 * | 10/2011 | Baarman | G01F 23/20 |
| | | | 235/385 |
| 2012/0001496 A1 * | 1/2012 | Yamamoto | H02J 50/00 |
| | | | 307/104 |
| 2013/0313249 A1 * | 11/2013 | Cregut | B60H 1/22 |
| | | | 219/630 |
| 2014/0117929 A1 * | 5/2014 | Lang | B62K 19/30 |
| | | | 320/108 |
| 2014/0266022 A1 * | 9/2014 | Degen | H02J 7/007 |
| | | | 320/108 |
| 2014/0327320 A1 * | 11/2014 | Muhs | H04B 5/0037 |
| | | | 307/104 |
| 2015/0241935 A1 * | 8/2015 | Jang | G06F 1/203 |
| | | | 361/679.54 |
| 2016/0059733 A1 | 3/2016 | Hettrich et al. | |
| 2017/0063137 A1 * | 3/2017 | Sultenfuss | H02J 7/025 |

\* cited by examiner

ELECTRONIC DEVICE WITH WIRELESS CHARGING AND BATTERY HEATING

This application claims the benefit of provisional patent application No. 62/359,333, filed Jul. 7, 2016, which is hereby incorporated by reference herein in its entirety.

FIELD

This relates generally to electronic device and, more particularly, to electronic devices with batteries.

BACKGROUND

Electronic devices are often powered by batteries. In cold environments, batteries exhibit decreased performance. If care is not taken, a battery in a cold electronic device may rapidly become unable to power the electronic device.

SUMMARY

A wireless power transmitting device may transmit wireless power signals to a wireless power receiving electronic device. The electronic device may have a coil that receives the transmitted wireless power signals. A power receiving circuit in the electronic device may rectify received wireless power signals to produce a corresponding direct-current voltage signal. The direct-current signal may be used to power circuitry in the electronic device and may be used to charge a battery in the electronic device.

Control circuitry in the electronic device may use a temperature sensor to make temperature measurements. The control circuitry may also gather user input, may gather information on which applications are running on the control circuitry, and may gather other information about the operating environment for the electronic device. In response to detecting that the device is below a given threshold temperature and in response to other information such as information on which applications are running on the device, the device may supply drive current signals to the coil to heat the battery and improve battery performance.

DETAILED DESCRIPTION

Figure 1:
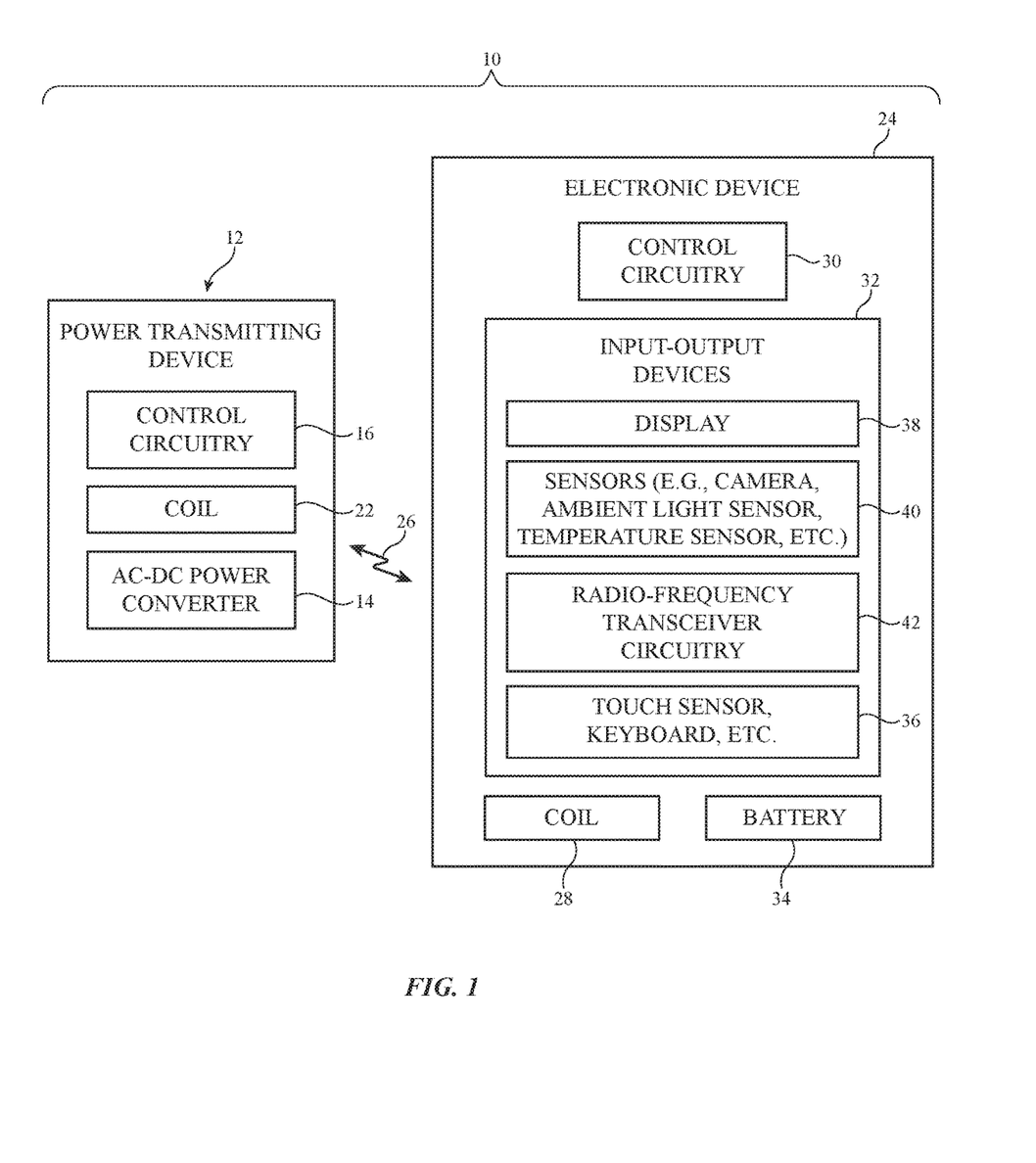
FIG. 1 is a schematic diagram of an illustrative system that includes an electronic device with wireless charging and battery heating capabilities in accordance with an embodiment.

FIG. 1 is a diagram of an illustrative system of the type that may have an electronic device with wireless power capabilities and battery heating capabilities. As shown in FIG. 1, wireless power system 10 may include a wireless power transmitting device such as wireless power transmitting device 12 and may include a wireless power receiving device such as electronic device 24. Wireless power transmitting device 12 may be a wireless power adapter or other equipment. Electronic device 24 may be a portable electronic device such as a wristwatch, a cellular telephone, a laptop computer, a tablet computer, or other electronic equipment.

Power transmitting device 12 may be coupled to a wall outlet or other source of alternating-current (AC) power and/or may have a battery for supplying direct-current (DC) power. Power transmitting device 12 may have an AC-DC power converter such as power converter 14 for converting AC power from a wall outlet into direct-current power. DC power from a battery or converter 14 may be used to power control circuitry 16. During operation, a controller in control circuitry 16 may turn on and off switching circuitry (e.g., transistors) to create AC signals through coil 22. As the AC signals pass through coil 22, electromagnetic signals 26 are produced that are received by corresponding coil 28 in electronic device 24.

Electronic device 24 may have control circuitry 30 and input-output devices 32. Device 24 may be powered by an internal power source such as battery 34. Device 24 may receive wireless power using coil 28 and may use the received power to power control circuitry 30 and input-output devices 32 and to charge battery 34.

Control circuitry 30 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 30 (e.g., a controller) may be used to control the operation of device 24. This processing circuitry may be based on one or more microprocessors, microcontrollers, digital signal processors, application specific integrated circuits, etc. In some examples, processing circuitry in control circuitry 30 is of an application-specific design. In some examples, processing circuitry in control circuitry 30 tangibly embodies (e.g., in a non-transitory fashion) computer executable code.

During operation, control circuitry 30 may be used to run software on device 24, such as internet browsing applications, voice-over-internet-protocol (VOIP) telephone call applications, email applications, media playback applications, software for supporting communications with external equipment, operating system functions, functions related to receiving wireless power, software for gathering temperature measurements and other sensor measurements, software for gathering user input, and software for heating batteries and taking other appropriate actions based on gathered information.

Input-output devices 32 may be used to allow data to be supplied to device 24 and to allow data to be provided from device 24 to external devices and/or users. Input-output devices 32 may include user interface devices such as touch sensors, keyboard, buttons, and other devices 36 that gather user input, may include input-output components such as display 38 (e.g., a display without a touch sensor or a touch screen display having a touch sensor for gathering user input). Devices 32 may also have sensors 40 such as microphones, digital image sensors (cameras), ambient light sensors, light-based proximity sensors, accelerometers and other sensors for detecting orientation and/or motion, capacitance sensors for gathering touch input, proximity data, and fingerprint readings, magnetic sensors, temperature sensors, force sensors (e.g., sensors that detect force input from a user's fingers), pressure sensors, gas sensors (e.g., carbon dioxide sensors, particulate sensors, etc.), and other sensors.

Radio-frequency transceiver circuitry 42 may include cellular telephone transceiver circuitry, wireless local area network transceiver circuitry, global positioning system circuitry or other satellite navigation system circuitry, millimeter wave transceiver circuitry, near-field communications transceiver circuitry, and other transceiver circuitry for transmitting and/or receiving wireless communications.

If desired, input-output devices 32 may include additional components (e.g., speakers for providing audio output, light-based status indicators (e.g., arrays of light-emitting diodes and/or other components for providing visual and/or audible output), haptic devices to provide a user with haptic output, digital data port devices to support communications between device 24 and external equipment over a wired communications path, etc.

Figure 2:
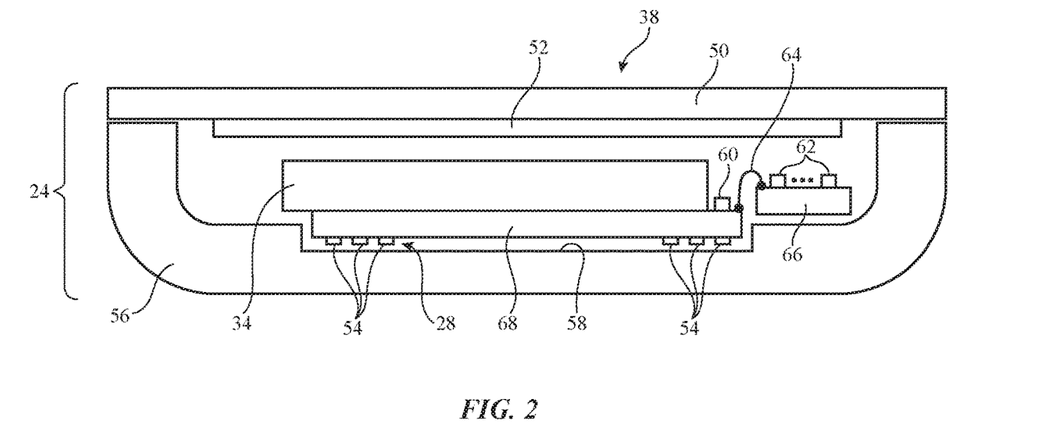
FIG. 2 is a cross-sectional side view of an illustrative electronic device with a wireless power receiving coil and a battery in accordance with an embodiment.

A cross-sectional side view of device 24 is shown in FIG. 2. As shown in FIG. 2, device 24 may have a housing such as housing 56. Housing 56 may be formed from metal, plastic, carbon-fiber composites or other fiber composites, glass, sapphire or other crystalline dielectric, ceramic, wood, fabric, other materials, or combinations of these materials. Display 38 may be mounted to housing 56. As an example, display 38 may be mounted on the front face of device 24 and housing 56 may form a planar rear wall on the rear face of device 24. Display 38 may be covered with a transparent protective layer such as display cover layer 50. Display cover layer 50 may be formed from clear plastic, transparent crystalline material such as sapphire, glass, or combinations of these materials. Display layer 52 may be a liquid crystal display, an organic light-emitting diode display, or other display that creates images for a user that are visible through display cover layer 50.

Battery 34 may be mounted in the interior of housing 56 of device 24. Battery 34 may have a thin planar shape and a rectangular outline or may have other suitable shapes. Coil 28 may be formed from loops of wire or other conductive signal paths. As an example, coil 28 may be formed from loops of metal traces 54 on substrate 68. There may be 1-50, 10-70, more than 20, more than 40, fewer than 100, fewer than 50, fewer than 25, or any other suitable number of loops of metal traces 54 in coil 28. The diameter of coil 28 may be 1-10 cm, may be more than 2 cm, more than 4 cm, more than 8 cm, more than 12 cm, less than 20 cm, less than 10 cm, less than 5 cm, or less than 2.5 cm, or other suitable size. Coil 28 may be circular, may be oval, may be rectangular, may be rectangular with rounded corners, or may have other suitable outlines. Substrate 68 may be a printed circuit (e.g., a flexible printed circuit formed from a sheet of flexible polymer such as a layer of polyimide or a rigid printed circuit board formed from fiberglass-filled epoxy or other rigid printed circuit board substrate material). Coil 28 may be interposed between battery 34 and housing 56. Coil 28 may, for example, be mounted in a recess such as recess 58 in the rear wall of housing 56.

Integrated circuits, discrete components, connectors, and other electrical components may be mounted on printed circuit 68 and/or other substrates in device 24 such as printed circuit 66, as illustrated by electrical components 60 and 62. Electrical components 60 and 62 may be attached to metal traces on printed circuit boards 68 and 66 using solder (as an example). Cables such as cable 64 (e.g. a flexible printed circuit cable, a portion of substrate 68, etc.) may be used in interconnecting printed circuit substrates in device 24 such as printed circuits 68 and 66.

During operation, device 24 may be placed on or near device 12, so that coil 28 may receive wireless power signals 26 from coil 22 in device 12. As an example, device 12 may be a wireless charging mat having one or more coils 22 in a planar configuration. Device 24 may be a watch, cellular telephone, tablet computer, laptop computer, or other electronic device that is placed on the wireless charging mat so that coil 28 is electromagnetically coupled to coil 22. In this configuration, control circuitry 16 of wireless power transmitting device 12 may use coil 22 to transmit wireless power signals 26 to device 24 and control circuitry 30 of device 24 may use coil 28 to receive the wireless power signals. Received power may be used in powering components in device 24 and may be used in charging battery 34.

Due to the proximity of coil 28 to battery 34, coil 28 may be used in heating battery 34. By heating battery 34, battery performance in colder battery operating temperatures can be improved. At cold temperatures, more battery performance can be gained by heating battery 34 than is lost in powering coil 28 to perform this heating operation. Notably, a charged battery in a cold environment can exhibit high impedance that renders much of the stored energy inaccessible. In these scenarios, the use of a small fraction of the stored energy to heat, and thereby reduce the battery's impedance, favorably enables access to the previously inaccessible stored energy.

Figure 3:
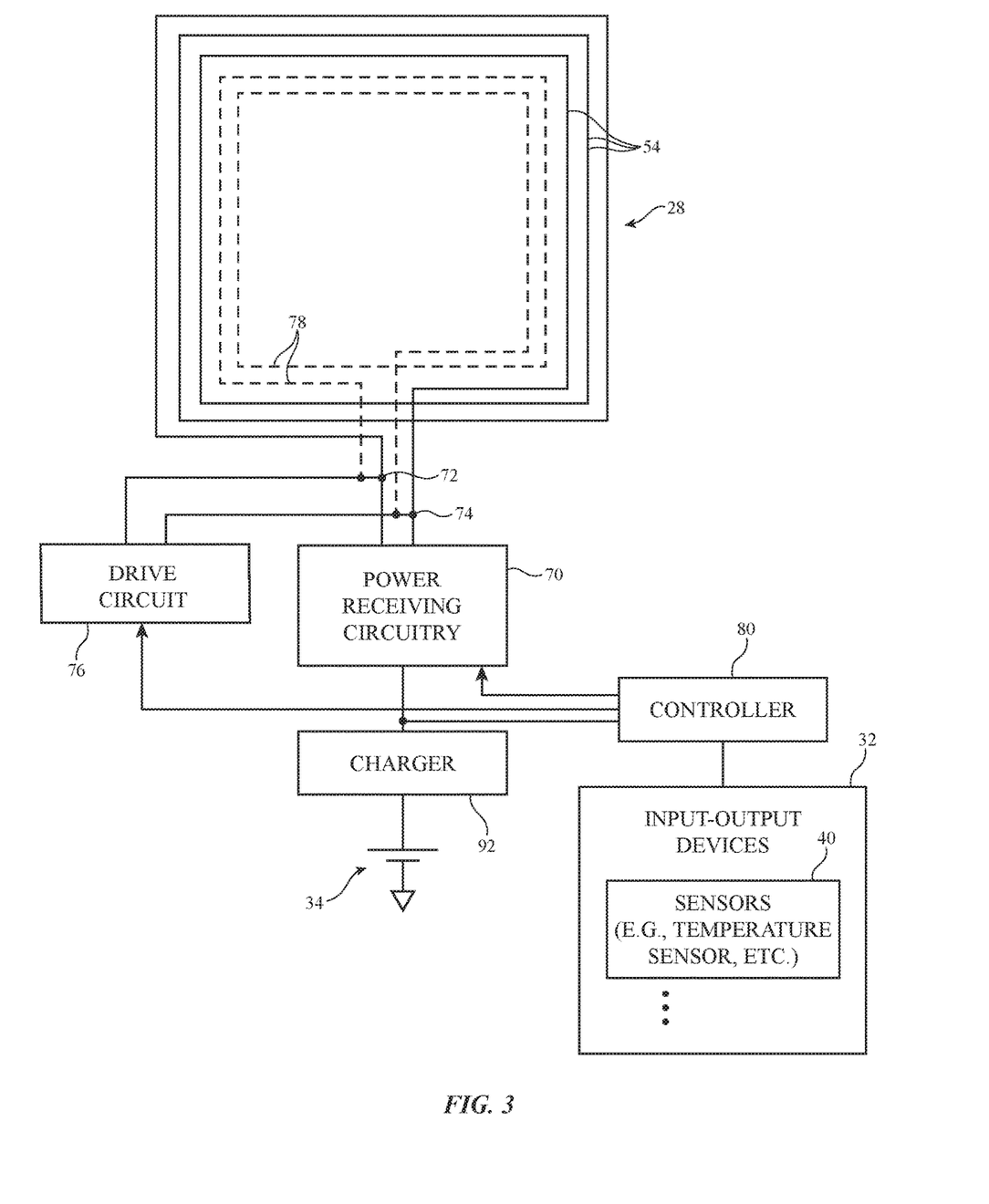
FIG. 3 is a diagram of an illustrative wireless power receiving coil in an electronic device and associated circuitry for converting received alternating-current signals from the coil into direct-current signals and for heating a battery using the coil in accordance with an embodiment.

FIG. 3 is a schematic diagram of wireless power circuitry in device 24. As shown in FIG. 3, power receiving circuitry 70 may be coupled to coil 28 at terminals 72 and 74. Coil 28 may be formed from loops of metal traces 54 on a substrate such as substrate 68 (FIG. 2). During operation, coil 28 may receive alternating-current (AC) wireless power signals 26 and may supply these AC signals to power receiving circuitry 70. Power receiving circuitry 70 may include a rectifier that rectifies the received AC signals and provides corresponding direct-current (DC) signals to charger 92. Charger 92 may use the DC power to charge battery 34. DC power from circuitry 70 may also be used in powering other components such as controller 80. Controller 80 may control the operation of coil driver circuitry such as drive circuit 76. Controller 80 may receive temperature data from a temperature sensor in sensors 40 and may receive information from other input-output devices 32. This information may be used in controlling drive circuitry 76. Temperature sensors may be used to measure battery temperature (e.g., using a temperature sensor that is adjacent to battery 34), may be used to measure internal device temperature (e.g., using a temperature sensor that is mounted to an internal housing member, a printed circuit board, or other internal device structure), and/or may be used to measure external temperatures (e.g., using a temperature sensor mounted on an exterior portion of device 24 and/or using a temperature sensor mounted in a housing port that is open to the exterior environment).

When battery 34 is cold (e.g., when the battery temperature measured by a battery temperature sensor is below a predetermined threshold temperature) or is expected to become cold soon (e.g., because the exterior and/or interior temperature of device 10 has dropped as a result of a user taking device 24 from a warm indoors environment into a cold outdoors environment), drive circuit 76 may apply a direct-current drive signal to coil 28 to ohmically heat coil 28 and thereby ohmically heat battery 34. If desired, drive circuit 76 may be used to supply an alternating-current signal to coil 28 to ohmically heat coil 28 and battery 34 and/or to induce eddy currents in a metal casing and other conductive components of battery 34 to heat battery 34. Drive circuit 76 may also supply a direct-current or alternating-current signal to a heating element formed from ohmic heating lines 78. Heating lines 78 may be formed from loops of metal traces on substrate 68 (e.g., loops of metal traces that are nested inside loops 54 and/or that overlap with loops 54, and/or that are formed on the opposite side of substrate 68 from loops 54), may be formed on substrate 68 in a zig-zag pattern or other pattern, or may be formed on a printed circuit or other substrate that is separate from substrate 68. Lines 78 may also form a heating coil that mounted on a substrate that is separate from substrate 68 or may form a stand-alone heating element. In configurations for device 24 with heating lines 78 that are separate from metal traces 54 of coil 28, drive circuit 76 may supply drive signals to heating lines 78 to heat battery 34 in addition to or instead of supplying drive current to coil 28 to heat battery 34.

Circuitry 70, controller 80, charger 92, and drive circuit 76 form part of control circuitry 30. Controller 80 may include processing and storage circuitry for running software for device 24. As shown in FIG. 3, controller 80 may be coupled to input-output devices 32. For example, controller 80 may use temperature sensors and user input devices in input-output devices 32 to gather temperature measurements and user input while operating device 24. Controller 80 may use this information to determine whether battery 34 is sufficiently cold and/or the expected power usage of a user's activities is great enough to warrant heating battery 34 with coil 54. Controller 80 may, if desired, be configured to implement a fail-safe mechanism to prevent the generation of heat by coil 28, heating lines 78, etc. in the event that the measured temperature from temperature sensor 40 exceeds a predetermined maximum threshold temperature. Heating may be permitted only when the measured temperature is below this safe upper limit. If desired, fail-safe circuitry may be incorporated into drive circuit 76 (e.g., drive circuit 76 may receive temperature measurements from a temperature sensor and/or other sensors 40 directly and may use this information to trigger a shut-down switch or other safety circuit in circuit 76 in the event that safe operating limits are about to be exceeded).

Figure 4:
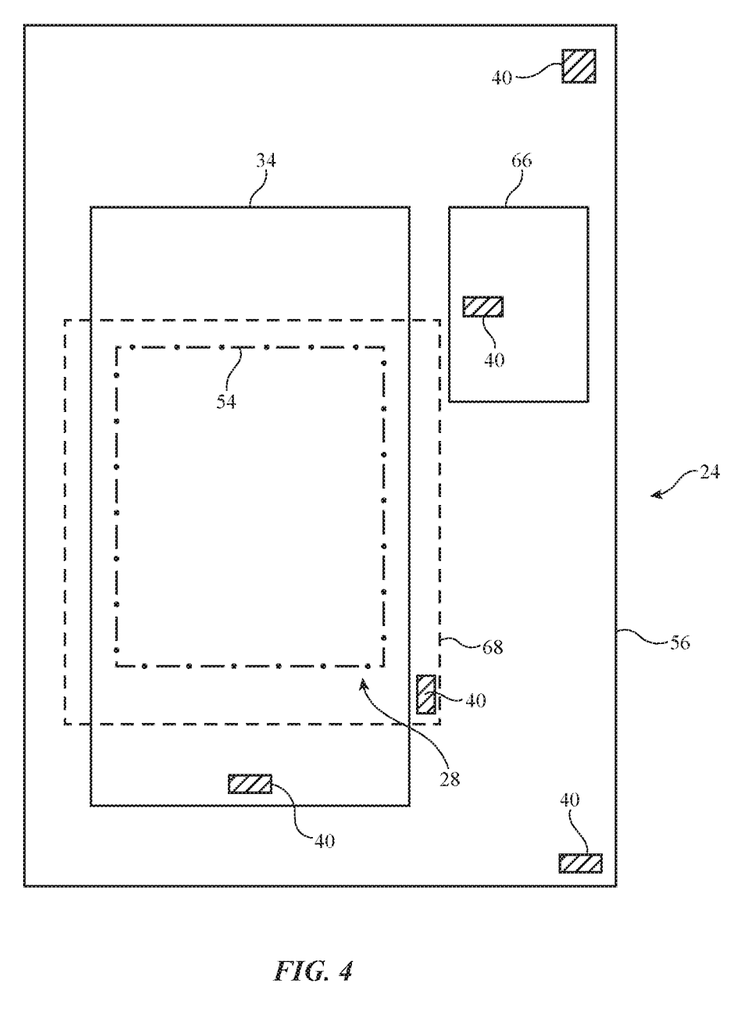
FIG. 4 is a top view of an illustrative electronic device having a battery, an overlapping coil, and temperature sensors in accordance with an embodiment.

Illustrative locations at which sensors 40 such as temperature sensors and/or other sensors 40 may be located are shown in the illustrative top view of device 24 of FIG. 4. As shown in FIG. 4, sensor(s) 40 (e.g., one or more temperature sensors) may be located at the upper end of housing 56, at the lower end of housing 56, on printed circuit 66, on printed circuit 68, on battery 34, or elsewhere in housing 56. Temperature sensors in sensors 40 may be attached to battery 34 to measure battery temperature, may be mounted in the vicinity of battery 34 (e.g., in the interior of device 24), and/or may be mounted on exterior surfaces or within ports that are exposed to the exterior of device 24 (e.g., to measure exterior temperature to help predict when device 24 and battery 34 will be cooled due to exposure to a cold environment). Using sensors 40, device 24 (e.g., control circuitry 30) can determine how device 24 is currently being operated and how device 24 is likely to be operated in the future. Control circuitry 30 can also gather user input (e.g., manual user input that directs device 24 to initiate battery heating, user input that sets application usage preferences and/or battery heating preferences, etc.).

Based on user input, real time data from sensors 40, and/or predicted device usage for device 24, device 24 can determine how much, if any, drive current from drive circuit 76 should be applied to coil 28 and/or the heating element formed from lines 78 to heat battery 34. If, as an example, the temperature of battery 34 and/or the ambient operating temperature of device 24 is −20° C. and a user has just launched a power-intensive application such as a video playback application, control circuitry 30 can predict that the user of device 24 is likely to use a large amount of power and that the performance of battery 34 could be significantly improved by raising the temperature of battery 34 by 30° C. or more. In this type of scenario, control circuitry 30 can direct drive circuit 76 to apply a drive signal to coil 28 (or the heating element formed from lines 78) to heat battery 34 and thereby improve the performance of battery 34. The energy expended in heating battery 34 in this way will be more than offset by the increase in performance in powering device 24 with a heated battery for the duration of the user's video playback operation.

Figure 5:
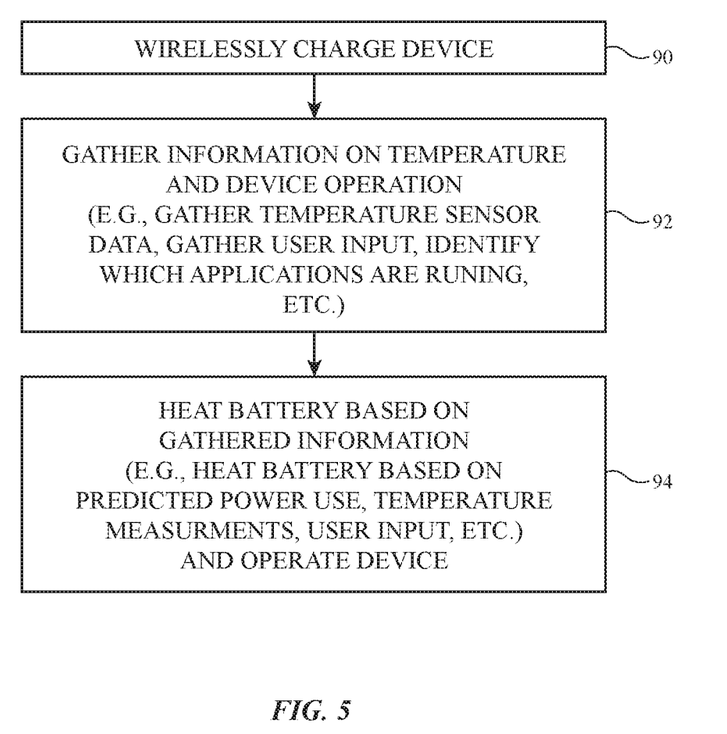
FIG. 5 is a flow chart of illustrative steps involved in operating an electronic device with wireless charging and battery heating capabilities in accordance with an embodiment.

FIG. 5 is a flow chart of illustrative operations involved in using system 10 to wirelessly power device 24 and to heat battery 34 to enhance the performance of battery 34. In some embodiments, one or more operations of FIG. 5 are carried out by control circuitry 30. Battery performance improvements (e.g., improvements to the amount of power delivered per amount of battery capacity consumed) may more than offset the battery drain resulting from heating the battery.

During the operations of block 90 of FIG. 5, power transmitting device 12 may wirelessly transmit power to device 24. During power transmission, control circuitry 16 may apply alternating-current drive signals to coil 22 that produce alternating-current wireless power signals 26. Coil 28 in device 24 may receive the transmitted alternating-current wireless power signals. Rectifier circuitry in power receiving circuitry 70 of device 24 may be used to convert the received alternating-current wireless power signals to direct-current voltage signals. Direct-current voltage signals (DC power) may be used by charger 92 to charge battery 34 and may be used in powering control circuitry 30 and input-output devices 32.

During use of device 24 by a user, device 24 may be exposed to cold operating environments. As an example, device 24 may be used outdoors when the ambient temperature is less than 10° C., less than 0° C., less than −10° C. or other reduced temperature. In environments such as these, the ability of battery 34 to deliver power (per unit of consumed battery capacity) may be impaired, because the chemical reactions involved in delivering power from the battery are adversely affected by cold temperatures. Battery performance can be restored by heating battery 34.

Although battery performance for a cold battery can be enhanced by heating, care should be taken when deciding whether or not to heat battery 34. Excessive heating of battery 34 when device 24 is not drawing significant power may waste battery capacity. For example, if a user leaves device 24 outside in cold temperatures overnight without actively using device 24, it would be counterproductive to expend battery power to heat battery 34. Even though battery 34 would be operate more performant if heated, there is no need to heat battery 34 when device 24 is not being significantly used for an extended period of time (e.g., if device 24 is in a low-power sleep state).

On the other hand, in situations in which a significant amount of power is needed by device 24, the battery capacity that is expended in heating battery 34 may be more than recouped by the increase in battery performance that results from heating battery 34. As an example, if a user is using device 24 to perform a power intensive task for an extended period of time, it will generally be desirable to heat battery 34 so that battery 34 exhibits optimum performance.

In view of these competing considerations, it may be desirable for device 24 to gather data that allows device 24 to optimize battery heating operations. This data may be gathered by device 24 during the operations of block 92 of FIG. 5. Data may be gathered by control circuitry 30 using input-output devices 32. For example, control circuitry 30 may gather temperature data from temperature sensors (e.g., temperature sensors in housing locations of the type described in FIG. 4 and/or other locations), may gather motion data from an accelerometer or other motion sensor, may gather ambient light data from an ambient light sensor, and/or may gather other sensor information from sensors 40.

The state of software (code) running on control circuitry 30 may be analyzed to provide insight into power consumption needs for device 24. For example, control circuitry 30 may gather information on which applications (instructions) are running on control circuitry 30 in real time. This information may reveal whether device 24 is in a low-power sleep state or is using a power intensive application such as a video playback application, a flashlight (torch) application in which a light-emitting diode is turned on to provide illumination for a user, a camera application that uses a digital image sensor to gather still and/or moving images, a file download application that uses radio-frequency transceiver circuitry 42 to download a data file wirelessly or that downloads data over a wired connection, an internet browsing application that downloads web content, or other application running on controller 80 (control circuitry 30) of device 24.

If desired, the information gathered during the operations of block 92 may include information on the brightness level of display 38. Brightness level information may be used to determine whether display 38 is at a high brightness that causes display 38 to consume power rapidly.

User input may also be gathered. For example, input from a user may be gathered from a touch screen (e.g., a response to an on-screen menu option), from a keyboard, keypad, buttons, microphone (e.g., voice commands), or other input device in input-output devices 32. The user input may include user-defined settings associated with battery heating and device power consumption. A user may, for example, specify that battery 34 should be heated whenever a particular application is launched or whenever a particular application has been used for more than a given amount of time, may specify that device 24 should provide an on-screen prompt before initiating battery heating operations, may specify that battery 34 should not be heated if the temperature is between 10° C. and 20° C. or is below 0° C. or other threshold temperature, may specify that battery 34 should be heated only between particular times of day, and/or may specify other aspects of the operation of device 24 related to the heating of battery 34. The information gathered during the operations of block 92 may include information on the current time and date, information on the location of device 24 (e.g., information gathered from a satellite navigation system receiver in device 24), historical information on device usage (e.g., information on what times of day and days of the week the user of device 24 launches and uses particular applications and the duration of such usage), may gather historical information on the operating environment of device 24 (e.g., times of day and days of week when device 24 is exposed to cold ambient environments that cool battery 34), and/or other information.

Based on the information gathered during the operations of block 92, device 24 (control circuitry 30) may, during the operations of block 94, direct drive circuitry such as drive circuit 76 to apply appropriate drive signals to coil 28 and/or to apply drive signals to ancillary heating lines such as lines 78 or other heating element(s) in device 24 to heat battery 34. Battery 34 need not be heated when device 24 is operating at room temperature or when device 24 is not consuming significant power (e.g., when device 24 is in a low power sleep state). If, however, device 24 is currently consuming or is predicted to shortly begin consuming significant power (e.g., more than a threshold amount of power as defined by default or user-defined settings) and if device 24 determines that battery 34 is currently at a reduced temperature (e.g., a temperature below a default threshold or user-defined threshold) so that performance improvements (battery capacity improvements) from heating battery 34 will offset the battery capacity consumed by heating battery 34, device 24 can heat battery 34 using drive circuit 76 and coil 28 (and/or using a heating element formed by lines 78 or other suitable heating element). The battery heating determinations made during the operations of block 94 may be made in real time, so that the amount of heat that is applied to battery 34 can be increased or decreased as appropriate.

The foregoing is merely illustrative and various modifications can be made to the described embodiments. The foregoing embodiments may be implemented individually or in any combination.

What is claimed is:

1. An electronic device configured to receive wirelessly transmitted power signals from a power transmitting device, comprising:
   a substrate;
   a battery mounted on the substrate;
   a wireless charging coil formed on the substrate and configured to receive the wirelessly transmitted power signals;
   a wireless power receiving circuit coupled to the wireless charging coil, wherein the wireless power receiving circuit is configured to produce direct-current signals from the received wirelessly transmitted power signals that charge the battery;
   a controller; and
   a drive circuit coupled to the wireless charging coil, wherein the controller is configured to apply a signal to the wireless charging coil with the drive circuit that heats the battery.

2. The electronic device defined in claim 1 further comprising:
   a housing; and
   a printed circuit having loops of metal traces that form the wireless charging coil, wherein the printed circuit is interposed between the battery and the housing, and wherein the wireless charging coil is coplanar with and overlaps the battery.

3. The electronic device defined in claim 2 further comprising at least one temperature sensor, wherein the controller is configured to gather temperature information with the at least one temperature sensor and is configured to apply the signal to the wireless charging coil based at least partly on the gathered temperature information.

4. The electronic device defined in claim 3 wherein the controller is configured to gather information on which applications are running on the controller and is configured to apply the signal to the wireless charging coil depending at least partly on which applications are running on the controller and wherein the temperature information comprises temperature information selected from the group consisting of: a battery temperature associated with the battery and an exterior temperature.

5. The electronic device defined in claim 4 wherein the controller is configured to apply the signal to the wireless charging coil based at least partly on identifying that the applications running on the controller include an application selected from the group consisting of: a flashlight application, a camera application, a video playback application, a file download application, and an internet browsing application.

6. The electronic device defined in claim 3 further comprising a display having a display brightness setting, wherein the controller is configured to apply the signal to the wireless charging coil based at least partly on the display brightness setting.

7. The electronic device defined in claim 1 wherein the drive circuit is configured to produce a direct-current signal and wherein the controller is configured to apply the direct-current signal to the wireless charging coil with the drive circuit to heat the battery.

8. The electronic device defined in claim 1 wherein the drive circuit is configured to produce an alternating-current signal and wherein the controller is configured to apply the alternating-current signal to the wireless charging coil with the drive circuit to heat the battery.

9. An electronic device configured to receive wirelessly transmitted power signals from a power transmitting device, comprising:
    a battery;
    a wireless charging coil configured to receive the wirelessly transmitted power signals;
    a wireless power receiving circuit coupled to the wireless charging coil, wherein the wireless power receiving circuit is configured to rectify the received wirelessly transmitted power signals and produce corresponding direct-current signals to charge the battery; and
    control circuitry that is configured to supply a signal to the wireless charging coil to heat the battery at least partly in response to determining that the battery is at a temperature below a threshold temperature, wherein the signal supplied to the wireless charging coil is a direct-current signal, and wherein the control circuitry includes a drive circuit coupled to the wireless charging coil that is configured to apply the direct-current signal to the wireless charging coil to ohmically heat the wireless charging coil and thereby heat the battery.

10. The electronic device defined in claim 9, wherein the electronic device has opposing front and rear faces, the electronic device further comprising:
    a display on the front face;
    a housing having a rear wall portion on the rear face, wherein the wireless charging coil is interposed between the rear wall portion and the battery.

11. The electronic device defined in claim 10 wherein the wireless charging coil comprises multiple loops of metal traces on a printed circuit substrate.

12. The electronic device defined in claim 11 further comprising a temperature sensor, wherein the control circuitry is configured to gather temperature measurements with the temperature sensor.

13. The electronic device defined in claim 12 further comprising:
    an input-output device that is configured to receive user input, wherein the control circuitry is configured to supply the direct-current signal to the wireless charging coil with the drive circuit to heat the battery at least partly based on the user input.

14. The electronic device defined in claim 13 wherein the control circuitry is further configured to identify which applications are running on the control circuitry and wherein the control circuitry is configured to supply the direct-current signal to the wireless charging coil with the drive circuit to heat the battery at least partly dependent on which applications are identified as running on the control circuitry.

15. The electronic device defined in claim 9 wherein the control circuitry is further configured to identify which applications are running on the control circuitry and wherein the control circuitry is configured to supply the signal to the wireless charging coil to heat the battery at least partly based on which applications are identified to be running on the control circuitry.

16. The electronic device defined in claim 15 further comprising a temperature sensor, wherein the control circuitry is configured to supply the signal to the wireless charging coil to heat the battery at least partly in response to determining that the battery is at the temperature below the threshold temperature using the temperature sensor.

17. An electronic device, comprising:
    a battery;
    a wireless charging coil on a printed circuit that is configured to receive wirelessly transmitted power signals;
    a wireless power receiving circuit coupled to the wireless charging coil, wherein the wireless power receiving circuit is configured to rectify the received wirelessly transmitted power signals and is configured to produce a corresponding direct-current voltage that charges the battery; and
    control circuitry that is configured to supply a signal to metal traces overlapping with the wireless charging coil on the printed circuit and a signal to the wireless charging coil to heat the battery.

18. The electronic device defined in claim 17 further comprising a temperature sensor, wherein the control circuitry is configured to measure temperature with the temperature sensor and is configured to supply the signal based at least partly on the measured temperature.

19. The electronic device defined in claim 18 wherein the signal that is supplied to the metal traces is a direct-current signal, and wherein the control circuitry is configured to supply the direct-current signal to the loops of metal traces.

20. The electronic device of claim 17, wherein the metal traces are nested within the wireless charging coil on the printed circuit.

* * * * *